(12) United States Patent
Morley et al.

(10) Patent No.: US 8,280,400 B1
(45) Date of Patent: Oct. 2, 2012

(54) MOBILE COMMUNICATION DEVICE WITH LOCATION-TRIGGERED TASKS

(75) Inventors: Dorothy Beau Morley, Wakefield, MA (US); Hannah Youngsil Moon, Boston, MA (US); Kathryn Mary Dobroth, Jamaica Plain, MA (US)

(73) Assignee: Cellco Partnership, Basking Ridge, NJ (US)

( * ) Notice: Subject to any disclaimer, the term of this patent is extended or adjusted under 35 U.S.C. 154(b) by 483 days.

(21) Appl. No.: 12/636,472

(22) Filed: Dec. 11, 2009

(51) Int. Cl.
*H04W 24/00* (2009.01)
(52) U.S. Cl. ............... 455/456.1; 455/404.2; 455/414.1; 455/414.2
(58) Field of Classification Search ............... 455/456.1, 455/404.2, 414.1, 414.2
See application file for complete search history.

(56) References Cited

U.S. PATENT DOCUMENTS

2008/0004039 A1 * 1/2008 Ober et al. ................. 455/456.1
* cited by examiner

*Primary Examiner* — Nghi H Ly (57) ABSTRACT

A mobile communication device may include a wireless communication system configured to wirelessly communicate with other communication systems. A location sensing system may be configured to sense the location of the mobile communication device. A data storage system may be configured to store data representative of tasks which the mobile communication device should perform at different locations. A task manager application may contain at least one algorithm. The algorithm may be configured to receive information indicative of the current location of the mobile communication device from the location-sensing system, query the data storage system for any tasks which the mobile communication device should perform at the current location, and cause any tasks located by the query to be performed while at the current location.

29 Claims, 4 Drawing Sheets

MOBILE COMMUNICATION DEVICE WITH LOCATION-TRIGGERED TASKS

BACKGROUND

1. Technical Field

This disclosure relates to mobile communication devices and to the tasks which they perform.

2. Description of Related Art

Mobile communication devices, such as cell phones, may offer a broad variety of selectable tasks for a user to perform. The number of selectable tasks may be so great as to require them to be organized in a complex, hierarchical menu. The menu may be so complex that it may be difficult and/or time consuming for the user to locate a desired task.

The menu may be customizable. The user may organize it in a way that is more intuitive and/or more efficient to use. For example, the user may position frequently-used items on the top level.

The mobile communication device may also include a broad variety of other types of settings which may also be set by a user, such as the ring style, call forwarding options, and the activation of a wireless local area network communication system, such as Wi-Fi.

However, a menu organizational and/or option settings which are optimal for a user at one location (e.g., the user's home) may not be optimal for the user at another location (e.g., the user's office). Customizing the menu and/or option settings may therefore not always be useful.

SUMMARY

A mobile communication device may include a wireless communication system configured to wirelessly communicate with other communication systems. A location sensing system may be configured to sense the location of the mobile communication device. A data storage system may be configured to store data representative of tasks which the mobile communication device should perform at different locations. A task manager application may contain at least one algorithm. The algorithm may be configured to receive information indicative of the current location of the mobile communication device from the location-sensing system, query the data storage system for any tasks which the mobile communication device should perform at the current location, and cause any tasks located by the query to be performed while at the current location.

The mobile communication device may include a user interface. The tasks may include changing the configuration of the user interface.

The user interface may include a menu of user-selectable items. The tasks may include changing the position of one of the user-selectable items in the menu. The menu may be a hierarchical menu of the user-selectable items. The tasks may include moving one of the user-selectable items to a higher menu, such as to the top of the hierarchical menu. The user-selectable item may call a contact when selected.

The tasks may include eliminating one or more of the user-selectable items from the menu.

The algorithm in the task manager application may be configured to return the user interface back to the configuration which it had before it was changed, after the mobile communication device is no longer at the current location.

The data storage system may be configured to store device settings which govern the operation of the mobile communication device. The tasks may include changing one of the device settings in the data storage system.

One of the device settings may govern the ring style of the mobile communication device. The tasks may include changing the ring style device setting in the data storage system.

One of the device settings may govern the forwarding of incoming calls to another communication device. The tasks may include changing the forwarding device setting in the data storage system.

One of the device settings may govern the forwarding of incoming calls to voicemail. The tasks may include changing the forwarding device setting in the data storage system.

One of the device settings may govern the activation of a wireless local area network communication system. The tasks may include changing the local wireless device setting in the data storage system.

One of the device settings may govern the accessibility of an application to a user of the mobile communication device. The tasks may include changing the accessibility device setting in the data storage system.

One of the device settings may govern a consent policy, such as allowing or disallowing the mobile communication device to be tracked (or located) by a specific application or allowing or disallowing the mobile communication device to receive advertising messages. The tasks may include changing the consent policy device setting in the data storage system.

The algorithm in the task manager application may be configured to return the device setting to the value which it had before it was changed, after the mobile communication device is no longer at the current location.

The tasks may include activating an application within the mobile communication device. The application may play multimedia. The application may call a contact stored in the mobile communication device.

One of the locations which the location sensing system may be configured to sense is the presence of the mobile communication device within a moving vehicle.

The algorithm in the task manager application may be configured to cause the tasks in the data storage system for a location to be performed automatically, without user confirmation, upon receiving information indicating that the mobile communication device has arrived at the location.

A mobile communication device may include a pattern detection application. The pattern detection application may contain at least one algorithm. The algorithm may be configured to receive information indicative of the current location of the mobile communication device from the location-sensing system. The algorithm may be configured to receive information indicative of tasks that are performed by a user of the mobile communication device at the current location. The algorithm may be configured to identify at least one task that is likely to be again performed by the user the next time the user is at the current location based on an analysis of the information indicative of the tasks that are performed by the user at the current location. The algorithm may be configured to cause the identified task to be stored in the data storage system along with an association of the identified task with the current location.

The algorithm in the pattern detection application may be configured to identify the at least one task based on the number of times the task is performed by the user while at the current location.

The algorithm in the pattern detection application may be configured to identify locations at which task are to be identified based on the number of times the user visits the location and/or the length of time the user spends at the location.

Computer readable storage media may contain computer-readable programming instructions which, when executed by a mobile communication device of any of the types described above, may cause the mobile communication device to perform any of the functions described above.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it refers to the same or like components or steps.

DETAILED DESCRIPTION OF ILLUSTRATIVE EMBODIMENTS

Illustrative embodiments are now discussed. Other embodiments may be used in addition or instead. Details that may be apparent or unnecessary may be omitted to save space or for a more effective presentation. Conversely, some embodiments may be practiced without all of the details that are disclosed.

Figure 1:
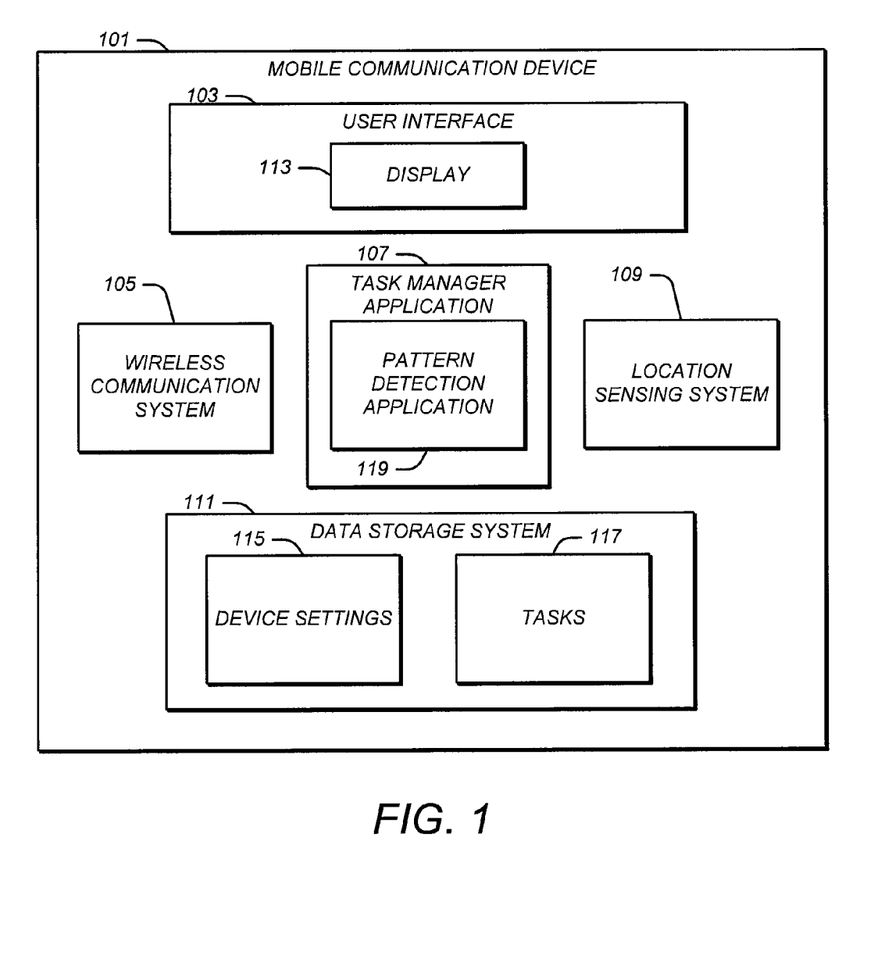
FIG. 1 is a block diagram of a mobile communication device that may execute location-triggered tasks.

FIG. 1 is a block diagram of a mobile communication device that may execute location-triggered tasks.

As illustrated in FIG. 1, a mobile communication device 101 may include a variety of components, such as a user interface 103, a wireless communication system 105, a task manager application 107, a location sensing system 109, and a data storage system 111.

The mobile communication device 101 may be of any type. For example, it may be a cell phone, a computer, a netbook, a wearable device such as a watch, or an embedded device in something that is mobile such as a car radio.

The wireless communication system 105 may be of any type. It may be configured to enable the mobile communication device 101 to communicate wirelessly with one or more other types of communication systems. For example, the wireless communication system 105 may include a transmitter and a receiver to enable the mobile communication device 101 to communicate with cell cites so as to enable communication with other cell phones. It may in addition or instead enable the mobile communication device to communicate over the Internet and/or a wireless local area network. The wireless communication system 105 may be configured to communicate voice, data, and/or any other type of information over the same or different communication links.

The user interface 103 may be of any type. It may include, for example, a display 113, which may or may not be of the touch screen type. The user interface 103 may include other types of input or output devices, such as a real or virtual keyboard, a mouse, a trackball or track pad, a microphone, earphones, a voice recognition system, and/or a loud speaker.

The user interface 103 may be configured to display a menu of user-selectable items. The menu may be in a hierarchical form.

The location sensing system 109 may be configured to sense the location of the mobile communication device 101. The location sensing system 109 may include any type of device or devices to accomplish this purpose. For example, the location sensing system 109 may include a GPS receiver, triangulation technology, and/or an accelerometer. The location sensing system 109 may be configured to sense the location of the mobile communication device 101 on earth or within a smaller geographic area.

The location sensing system 109 may be configured to sense whether the mobile communication device 101 is located within a vehicle that is in motion, such as an automobile. It may be configured to do so based on detecting the speed at which the mobile communication device 101 is moving. For example, if the mobile communication device 101 is moving at between 10 and 100 miles per hour, the location sensing system 109 may interpret this as meaning that the mobile communication device 101 is currently located in a moving vehicle.

The data storage system 111 may be of any type. For example, it may include one or more RAMS, ROMS, PROMS, ePROMS, flash memories, hard disk drives, DVD's, and/or CD's.

The data storage system 111 may be configured to store a variety of data. For example, the data storage system 111 may be configured to store one or more device settings 115.

Each of the device settings 115 may govern a particular operation of the mobile communication device 101. For example, one of the device settings 115 may govern the ring style of the mobile communication device 101, such as indicating whether the mobile communication device 101 should ring with an audible sound or with vibration. The volume of the sound or amplitude of the vibrations may also be specified in the device setting 115.

Another of the device settings 115 may relate to call forwarding. One setting may govern whether an incoming call is forwarded to another number, while another setting may govern whether an incoming call is forwarded to voicemail. The forwarding settings may be different for incoming calls from different numbers. Similar types of forwarding settings may be provided in connection with incoming messages or other types of incoming communications.

One of the device settings 115 may be a setting which dictates whether wireless local area network communication, such as Wi-Fi, is activated. Examples of other device settings 115 may include whether Bluetooth is activated, whether EVDO or 3G bandwidth is preferred, whether email should be pushed to the device, or whether GPS is activated for tracking by specific applications.

The data storage system 111 may be configured to store data representative of tasks 117 which the mobile communication device 101 should perform at different locations. Each of the tasks 117 may be stored with information associating the task with a particular location. For example, the data storage system 111 may be configured to store a set of different locations and, in connection with each location, one or more tasks which should be performed when arriving at that location.

The location information may be stored in the data storage system 111 in any format. For example, the location information may specify the longitude, latitude, and/or altitude of the mobile communication device 101. The location information may in addition or instead specify a street address. The location information in the data storage system 111 may include a range specification indicative of a deviation from the location which may still be regarded as being at the location. The range may be a global range applicable to all locations or a separate range may be stored for each location and/or each task.

The tasks 117 may include any type of task that may be performed by the mobile communication device 101.

The tasks 117 may include changing the configuration of the user interface 103. For example, the tasks 117 may include changing the position of one of the user-selectable items in a menu. When the menu is a hierarchical menu, the tasks 117 may include moving one of the user-selectable items to a higher menu, such as to the top of the hierarchical menu. The user-selectable item may be to call a contact. The tasks 117 may include other changes to the user interface, such as giving one or more user-selectable items emphasis, and/or reprogramming functions associated with soft keys.

The tasks 117 may include changing one or more of the device settings 115 in the data storage system 111. For example, the tasks 117 may include changing the ring style device setting, a call forwarding device setting, such as to forward a call to voicemail or to a different number, and/or a wireless local area network setting, such as to activate or deactivate an internal Wi-Fi device.

The tasks 117 may include tasks of other types. For example, the tasks 117 may include activating an application within the mobile communication device 101, such as activating an application which plays a multimedia file, and/or activating an application which calls a specific contact. The tasks 117 may include disabling an application which otherwise might be accessible to a user of the mobile communication device 101. For example, a parent who provides her child with a cell phone may configure a task to deactivate a texting application when the cell phone is located within a moving vehicle.

The task manager application 107 may be configured to receive information indicative of the current location of the mobile communication device from the location sensing system 109. The task manager application 107 may be configured to query the data storage system 111 for any tasks which the mobile communication device 101 should perform at the current location. The task manager application 107 may be configured to cause any tasks which are located by the query to be performed while at the current location, such as when the mobile communication device 101 arrives at the current location.

The task manager application 107 may be configured to receive information indicative of the current location of the mobile communication device 101, query the data storage system 111, and cause any tasks located by the query to be performed automatically and without user confirmation, upon receiving information indicating that the mobile communication device 101 has arrived at a location for which one or more tasks 117 are specified in the data storage system 111. Arrival may be defined as being with a range limit. The user interface 103 may be configured to provide the user with a user control which may be configured to enable the user to activate or deactivate the functions of the task manager application 107, in whole or in part. The task manager application 107 may be configured to request user permission to implement tasks in the data storage system 111 upon arriving at a location specified in the data storage system 111 and to require that permission to be provided by the user before the tasks associated with that location, as contained within the data storage system 111, are performed. The task manager application 107 may instead be configured to perform these tasks automatically, without requiring user confirmation. Whether the task manager application 107 requires user confirmation before performing task may itself be a configurable setting.

When one of the tasks 117 is to change the configuration of the user interface 103 and/or one of the device settings 115, the task manager application 107 may be configured to return the user interface 103 or the device setting back to the configuration which it had before it was changed, after the mobile communication device is no longer at the current location. This point may include consideration of any range which has been provided.

The task manager application 107 may include a pattern detection application 119. The pattern detection application 119 may be configured to receive information indicative of the current location of the mobile communication device 101 from the location sensing system 109. The pattern detection application 119 may be configured to receive information indicative of tasks that are performed by a user of the mobile communication device at the current location. The pattern detection application 119 may be configured to identify at least one task that is likely to again be performed by the user next time the user is at the current location based on this information. The pattern detection application 119 may be configured to cause the identified task to be stored in the data storage system 111, along with an association of the identified task with the current location.

The pattern detection application 119 may be configured to identify the at least one task that is likely to be again performed by the user the next time the user is at the current location based on any type of algorithm. For example, the pattern detection application 119 may be configured to identify this task based on an analysis of the tasks that are performed by the user at the current location. To qualify, the pattern detection application 119 may be configured to count the number of times a user has performed a particular task at a particular location and to identify the task as one which the user is likely to again perform at the location if the number of times which the user has performed the task exceeds a predetermined amount. The pattern detection application 119 may be configured in addition or instead to compare the number of times the user has performed different tasks at a particular location and to identify those which have been performed the most as the ones likely to be performed again by the user at this location.

The pattern detection application 119 may be configured to identify locations at which tasks should be identified for storage in the data storage system 111. The pattern detection application 119 may be configured to do so using any algorithm. For example, the pattern detection application 119 may identify a location for which a task should be stored in the data storage system 111 based on the number of times a user has visited the location and/or the length of time which the user has been at the location.

The pattern detection application 119 may be configured to store information about the locations which the user has visited and/or about the tasks which the user has performed at these locations over a prolonged period so as to enable the identification of tasks and/or the identification of locations to be determined based on aggregated information.

The pattern detection application 119 may be configured to store in the data storage system 111 the task which the pattern detection application 119 has determined the user is likely to again to perform, along with the locations at which they are likely to be performed. The pattern detection application 119 may be configured to seek user approval of each task and/or each location which it has identified and proposes to store in the data storage system 111 before storing this information.

The user interface 103 may be configured to allow the user to either accept or reject each task and/or location and/or to modify each task and/or location before it is stored in the data storage system 111.

The task manager application 107 may be configured to allow the user to manually designate each location at which tasks are to be performed and/or each task which is to be performed at each location. The task manager application 107 may configured to allow the user to provide a name for each location, such as "Work," "Office," "School," "Soccer," and/or "Mom's house."

The task manager application 107 may be configured to provide a range in association with each location. The range may indicate the distance from the location at which the task manager application 107 may still regard the mobile communication device 101 as still being at the location. The task manager application 107 may specify this range by default and/or may allow the user to specify the range, globally and/or in connection with each location and/or each task.

The task manager application 107 may be configured to store each of the user-specified tasks and each of the associated user-specified locations in the data storage system 111, along with any range information which is provided.

The task manager application 107, including the pattern detection application 119, may include one or more algorithms configured to perform each of the functions which these applications have been described herein as being configured to perform. These algorithms may be implemented in the form of one or more computer programs which are stored on one or more program storage devices, such as one or more RAMS, ROMS, PROMS, ePROMS, flash memories, hard disk drives, DVD's, and/or CD's.

Copies of the task manager application 107, including the pattern detection application 119, may be stored on one or more computer-readable storage media, such as one or more RAMS, ROMS, PROMS, ePROMS, hard disk drives, flash memories, DVD's, and/or CD's. When separate from the mobile communication device 101, these applications may be configured to be transferred from their computer-readable storage media into the mobile communication device 101 and configured for execution.

FIGS. 2A-2J illustrate a process that may be followed to manually program a mobile communication device with location-triggered tasks.

Figure 2A:
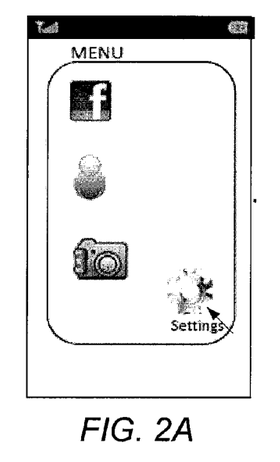
FIGS. 2A-2J illustrate a process that may be followed to manually program a mobile communication device with location-triggered tasks.

FIG. 2A illustrates a default main menu on a screen of a mobile communication device, such as a cell phone. The mobile communication device may be of any of the types discussed above or of any other type. One or more of the user-selectable items which are in the main menu may not be ones which are of interest to a user while at a particular location. Ones which are of interest to the user at the particular location, on the other hand, may not be displayed at this top level.

Figure 2B:
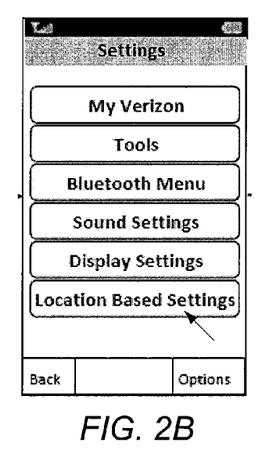
Figure 2C:
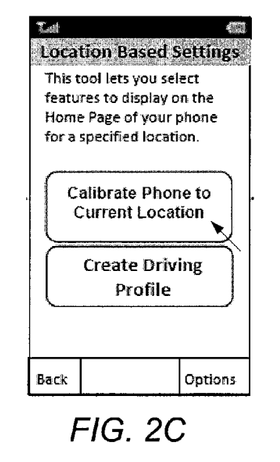

To correct for this, a user may select the settings icon, as illustrated in FIG. 2A. This may result in the display of various setting types, as illustrated in FIG. 2B. As illustrated in FIG. 2B, one of the setting types may be to "Calibrate UI." When selected, this may cause a Calibrate UI screen to be displayed, as illustrated in FIG. 2C. It may also activate the task manager application 107 and place it in a programming mode. One of the other settings may be selected instead with comparable results.

As illustrated in FIG. 2C, the user may elect to calibrate the user interface for her current location. To do so, the user may select "Calibrate Phone to Current Location," as illustrated in FIG. 2C. When selected, this may cause the screen illustrated in FIG. 2D to appear.

Figure 2D:
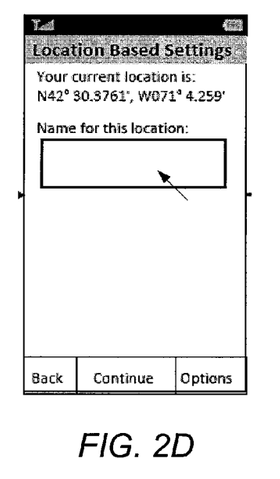
Figure 2E:
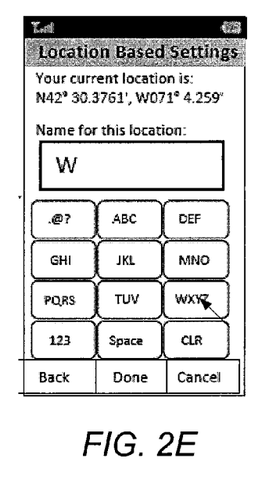
Figure 2F:
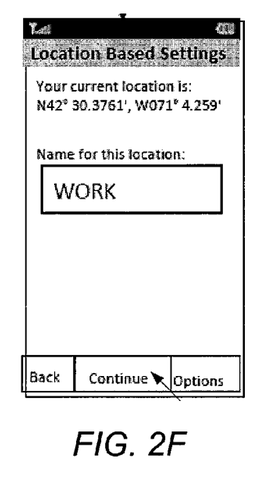

As illustrated in FIG. 2D, the user may select the location dialog box, which may cause a keyboard to appear, as illustrated in FIG. 2E. The user may then specify a name for the current location, as illustrated in FIGS. 2E-2F. When completed, the user may select a type of task to be performed when reaching this location, as illustrated in FIG. 2G.

Figure 2G:
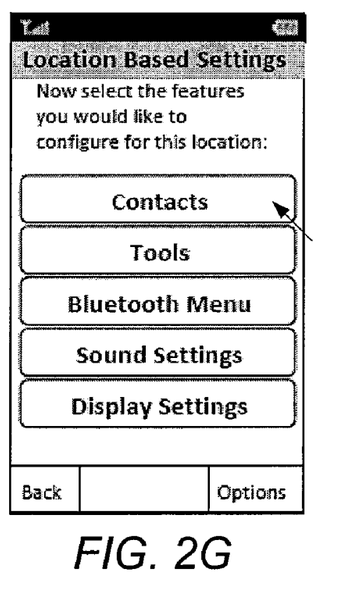
Figure 2H:
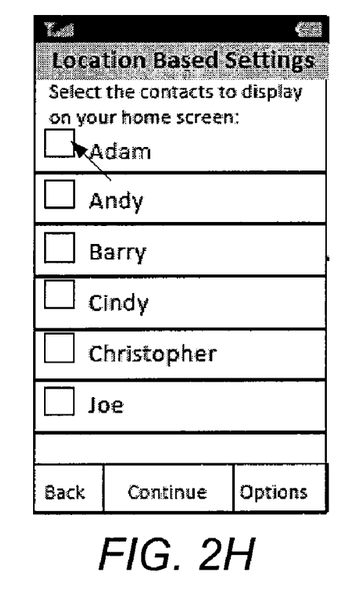

As illustrated in FIG. 2G, the user may select "Contacts," which may be configured to cause a selected contact to be displayed at the top of the hierarchical menu. This may trigger a screen on which the user may select the contact, as illustrated in FIG. 2H.

Figure 2I:
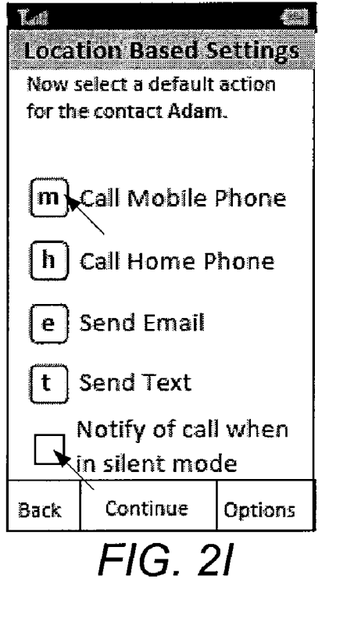
Figure 2J:
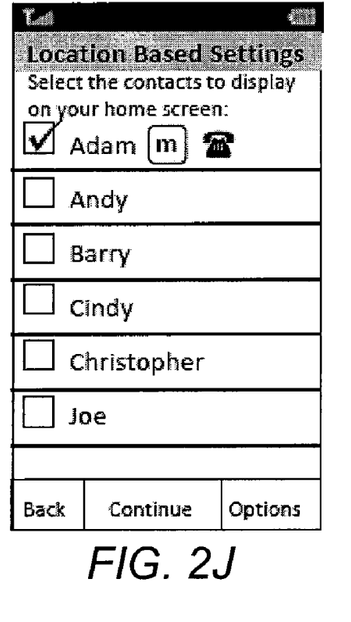

As illustrated in FIG. 2I, the user may next specify one or more actions which are to be taken in connection with this selected contact, such as to call his mobile phone when selected, and such as to notify the user of an incoming call when the phone is set in a silent mode. As illustrated in FIG. 2J, the selections which the user made in FIG. 2I may be confirmed by the display of appropriate icons.

The user may return to the screen illustrated in FIG. 2A to repeat this programming process to define other locations at which tasks should be performed and/or to cause other tasks to be performed at one or more of these locations. During or following this user programming, the programmed locations and tasks may be stored by the task manager application 107 in the data storage system 111.

Figure 3:
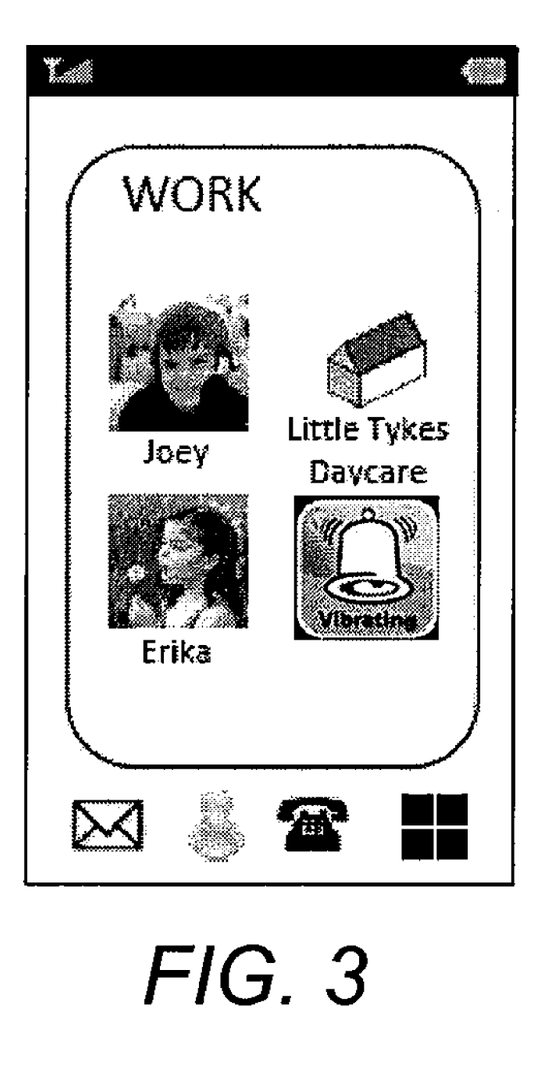
FIG. 3 illustrates a display in a mobile communication device after location-triggered tasks have been triggered.

FIG. 3 illustrates a display in a mobile communication device after location-triggered tasks have been triggered. As illustrated in FIG. 3, the default main menu which is illustrated in FIG. 2A may be altered by tasks that were triggered when the mobile communication device 101 arrived at a location at which these tasks were specified to be performed in the data storage system 111. As illustrated in FIG. 3, three contacts have been moved to the top menu and the ring style has been set to the vibrating mode.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

For example, tasks may also or instead be set remotely though a web interface. The web interface may present a route which the mobile communication device has or may traverse. The web interface may allow a location to be selected for task programming merely by clicking on the desired location on the displayed route.

The task programming interface may be more closely integrated with the normal operational menu. For example, selecting a contact during normal operation may automatically cause a task to be generated and stored within the data storage system which causes that contact to be placed in a top-level menu upon entering the locating at which the contact was selected. A user-confirmation dialog box may also be presented before the task is stored.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials that have been described and their equivalents. Similarly, the phrase "step for" when used in a claim embraces the corresponding acts that have been described and their equivalents. The absence of these phrases means that the claim is not intended to and should not be interpreted to be limited to any of the corresponding structures, materials, or acts or to their equivalents.

Nothing that has been stated or illustrated is intended or should be interpreted to cause a dedication of any component, step, feature, object, benefit, advantage, or equivalent to the public, regardless of whether it is recited in the claims.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

The invention claimed is:

1. A mobile communication device comprising:
   a wireless communication system configured to wirelessly communicate with other communication systems;
   a location sensing system configured to sense the location of the mobile communication device;
   a data storage system configured to store data representative of tasks which the mobile communication device should perform at different locations; and
   a task manager application containing at least one algorithm configured to:
      receive information indicative of the current location of the mobile communication device from the location-sensing system;
      query the data storage system for any tasks which the mobile communication device should perform at the current location; and
      cause any tasks located by the query to be performed while at the current location.

2. The mobile communication device of claim 1 further comprising a user interface and wherein the tasks include changing the configuration of the user interface.

3. The mobile communication device of claim 2 wherein the user interface includes a menu of user-selectable items and the tasks include changing the position of one of the user-selectable items in the menu.

4. The mobile communication device of claim 3 wherein the menu is a hierarchical menu of the user-selectable items and the tasks include moving one of the user-selectable items to a higher menu.

5. The mobile communication device of claim 4 wherein the tasks include moving the user-selectable item to the top of the hierarchical menu.

6. The mobile communication device of claim 5 wherein the user-selectable item calls a contact when selected.

7. The mobile communication device of claim 3 wherein the tasks include eliminating one or more of the user-selectable items from the menu.

8. The mobile communication device of claim 2 wherein the algorithm in the task manager application is configured to return the user interface back to the configuration which it had before it was changed after the mobile communication device is no longer at the current location.

9. The mobile communication device of claim 1 wherein the data storage system is configured to store device settings which govern the operation of the mobile communication device and wherein the tasks include changing one of the device settings in the data storage system.

10. The mobile communication device of claim 9 wherein one of the device settings governs the ring style of the mobile communication device and wherein the tasks include changing the ring style device setting in the data storage system.

11. The mobile communication device of claim 9 wherein one of the device settings governs the forwarding of incoming calls to another communication device and wherein the tasks include changing the forwarding device setting in the data storage system.

12. The mobile communication device of claim 9 wherein one of the device settings governs the forwarding of incoming calls to voicemail and wherein the tasks include changing the forwarding device setting in the data storage system.

13. The mobile communication device of claim 9 wherein one of the device settings governs the activation of a wireless local area network communication system and wherein the tasks include changing the local wireless device setting in the data storage system.

14. The mobile communication device of claim 9 wherein one of the device settings governs the accessibility of an application to a user of the mobile communication device and wherein the tasks include changing the accessibility device setting in the data storage system.

15. The mobile communication device of claim 9 wherein one of the device settings governs a consent policy and wherein the tasks include changing the consent policy device setting in the data storage system.

16. The mobile communication device of claim 15 wherein the consent policy relates to tracking of the mobile communication device.

17. The mobile communication device of claim 15 wherein the consent policy relates to receiving advertising messages.

18. The mobile communication device of claim 9 wherein the algorithm in the task manager application is configured to return the device setting to the value which it had before it was changed after the mobile communication device is no longer at the current location.

19. The mobile communication device of claim 1 wherein the tasks include activating an application within the mobile communication device.

20. The mobile communication device of claim 1 wherein the tasks include playing multimedia.

21. The mobile communication device of claim 1 wherein the tasks include calling a contact stored in the mobile communication device.

22. The mobile communication device of claim 1 wherein one of the locations which the location sensing system is configured to sense is the presence of the mobile communication device within a moving vehicle.

23. The mobile communication device of claim 1 wherein the algorithm in the task manager application is configured to cause the tasks in the data storage system for a location to be performed automatically and without user confirmation upon receiving information indicating that the mobile communication device has arrived at the location.

24. A mobile communication device comprising:
   a wireless communication system configured to wirelessly communicate with other communication systems;
   a location sensing system configured to sense the location of the mobile communication device;
   a data storage system configured to store data representative of tasks which the mobile communication device should perform at different locations; and
   a pattern detection application containing at least one algorithm configured to:

receive information indicative of the current location of the mobile communication device from the location-sensing system;

receive information indicative of tasks that are performed by a user of the mobile communication device at the current location;

identify at least one task that is likely to be again performed by the user the next time the user is at the current location based on an analysis of the information indicative of the tasks that are performed by the user at the current location; and cause the identified task to be stored in the data storage system along with an association of the identified task with the current location.

25. The mobile communication device of claim 24 wherein the algorithm in the pattern detection application is configured to identify the at least one task based on the number of times the task is performed by the user while at the current location.

26. The mobile communication device of claim 24 wherein the algorithm in the pattern detection application is configured to identify locations at which task are to be identified based on the number of times the user visits the location.

27. The mobile communication device of claim 24 wherein the algorithm in the pattern detection application is configured to identify locations at which task are to be identified based on the length of time the user spends at the location.

28. Computer readable storage media containing computer-readable programming instructions which, when executed by a mobile communication device having:

a wireless communication system configured to wirelessly communicate with other communication systems;

a location sensing system configured to sense the location of the mobile communication device; and a data storage system configured to store data representative of tasks which the mobile communication device should perform at different locations;

cause the mobile communication device to:

receive information indicative of the current location of the mobile communication device from the location-sensing system;

query the data storage system for any tasks which the mobile communication device should perform at the current location; and cause any tasks located by the query to be performed while at the current location.

29. Computer readable storage media containing computer-readable programming instructions which, when executed by a mobile communication device having:

a wireless communication system configured to wirelessly communicate with other communication systems;

a location sensing system configured to sense the location of the mobile communication device; and a data storage system configured to store data representative of tasks which the mobile communication device should perform at different locations;

cause the mobile communication device to:

receive information indicative of the current location of the mobile communication device from the location-sensing system;

receive information indicative of tasks that are performed by a user of the mobile communication device at the current location;

identify at least one task that is likely to be again performed by the user the next time the user is at the current location based on an analysis of the information indicative of the tasks that are performed by the user at the current location; and cause the identified task to be stored in the data storage system along with an association of the identified task with the current location.

* * * * *